(12) United States Patent
Huët

(10) Patent No.: US 10,562,373 B2
(45) Date of Patent: Feb. 18, 2020

(54) FLAP WITH A COUNTERWEIGHT FOR AN AIR EXTRACTOR OF A MOTOR VEHICLE

(71) Applicant: ILLINOIS TOOL WORKS INC., Glenview, IL (US)

(72) Inventor: Laurent Huët, Méru (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/527,193

(22) PCT Filed: Nov. 6, 2015

(86) PCT No.: PCT/US2015/059444
§ 371 (c)(1),
(2) Date: May 16, 2017

(87) PCT Pub. No.: WO2016/081208
PCT Pub. Date: May 26, 2016

(65) Prior Publication Data
US 2017/0320377 A1 Nov. 9, 2017

(30) Foreign Application Priority Data
Nov. 18, 2014 (FR) ..................................... 14 61130

(51) Int. Cl.
*B60H 1/24* (2006.01)
*F24F 11/75* (2018.01)
*B60H 1/00* (2006.01)

(52) U.S. Cl.
CPC ......... *B60H 1/249* (2013.01); *B60H 1/00671* (2013.01); *B60H 1/00678* (2013.01); *F24F 11/75* (2018.01)

(58) Field of Classification Search
CPC ... B60H 1/248; B60H 1/249; Y10T 137/7898; F16K 15/03
(Continued)

(56) References Cited

U.S. PATENT DOCUMENTS 2,224,494 A 12/1940 White
2,421,838 A * 6/1947 Cline .................... F01N 13/085
137/527.8

(Continued)

FOREIGN PATENT DOCUMENTS

| CN | 101196208 A | 6/2008 |
|---|---|---|
| DE | 10 2004 052074 | 4/2006 |

(Continued)

OTHER PUBLICATIONS

PCT, International Search Report and Written Opinion, International Application No. PCT/US2015/059444; dated May 26, 2016, 8 pages.

*Primary Examiner* — Steven B McAllister
*Assistant Examiner* — Ko-Wei Lin
(74) *Attorney, Agent, or Firm* — Thompson Hine LLP

(57) ABSTRACT

The present invention relates to a flap (214) for an air extractor (210), in particular of a motor vehicle, said flap comprising a rigid or semi-rigid wall (242), articulation means (240) to allow a pivoting of the flap about an axis (A) substantially parallel to the wall, and at least one counterweight at a distance from said wall and removably connected to said wall (242). It also relates to an air extractor (210), in particular of a motor vehicle, comprising a support (212) having at least one window (218) defining an opening for the passage of air and at least one flap as described above and movable between a position of closure of the opening and a position of opening up this opening.

15 Claims, 10 Drawing Sheets

(58) Field of Classification Search
USPC ........ 137/527, 527.8, 855; 454/359, 162, 70
See application file for complete search history.

(56) References Cited

U.S. PATENT DOCUMENTS

| | | | | |
|---|---|---|---|---|
| 3,122,983 | A | * | 3/1964 | Duggan et al. ......... F24D 19/04 |
| | | | | 165/129 |
| 5,727,999 | A | | 3/1998 | Lewis |
| 5,921,862 | A | * | 7/1999 | Ucciardi .................. F24F 11/75 |
| | | | | 454/353 |
| 6,475,078 | B1 | * | 11/2002 | Borcherding ........ A01K 1/0064 |
| | | | | 454/259 |
| 6,533,656 | B2 | * | 3/2003 | Hertel ................. F24F 13/1406 |
| | | | | 454/259 |
| 7,686,530 | B2 | | 3/2010 | Schilz |
| 2005/0003755 | A1 | | 1/2005 | Koessler |
| 2006/0042688 | A1 | | 3/2006 | Sebor |
| 2008/0138151 | A1 | * | 6/2008 | Schilz ................... F16C 11/069 |
| | | | | 403/141 |
| 2012/0003907 | A1 | | 1/2012 | Carlson |
| 2013/0267159 | A1 | * | 10/2013 | McCarthy .......... B60H 1/00457 |
| | | | | 454/162 |

FOREIGN PATENT DOCUMENTS

| | | |
|---|---|---|
| EP | 1671825 | 6/2006 |
| GB | 2432656 | 5/2007 |
| WO | WO 20100105176 A2 | 9/2010 |
| WO | WO 2014/070389 | 5/2014 |

\* cited by examiner

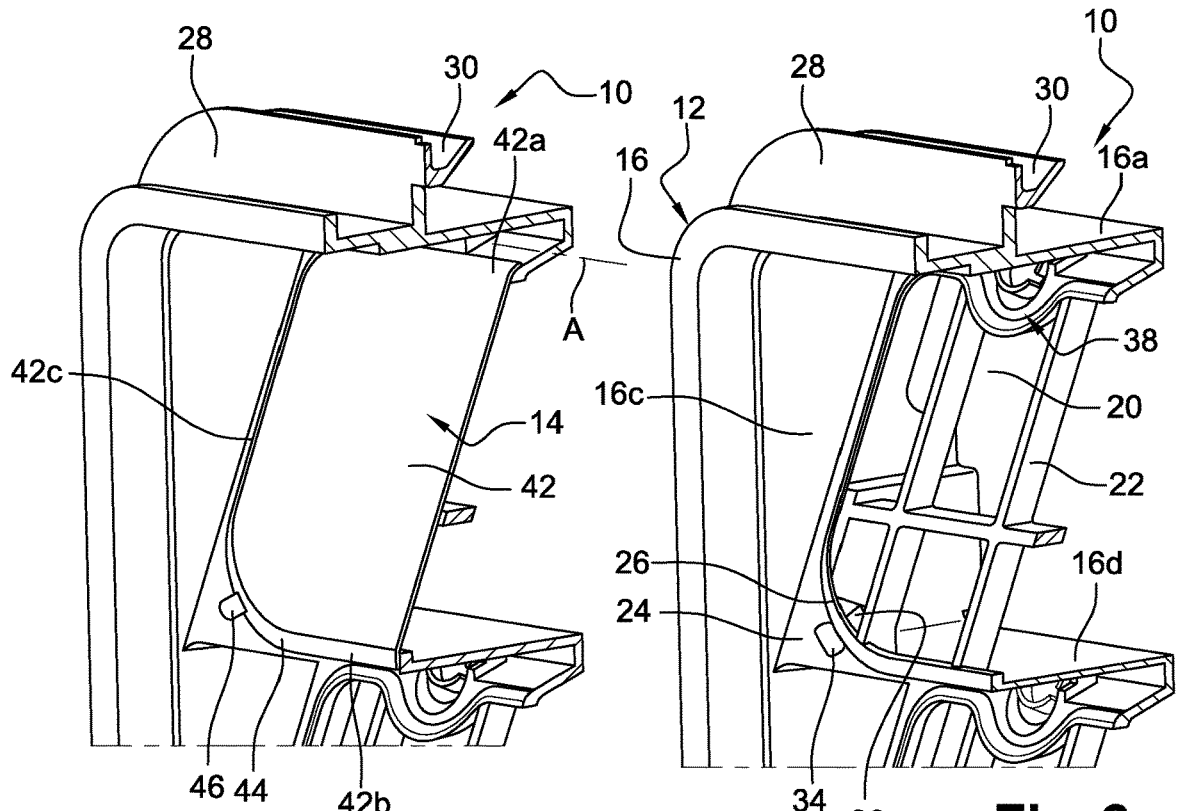
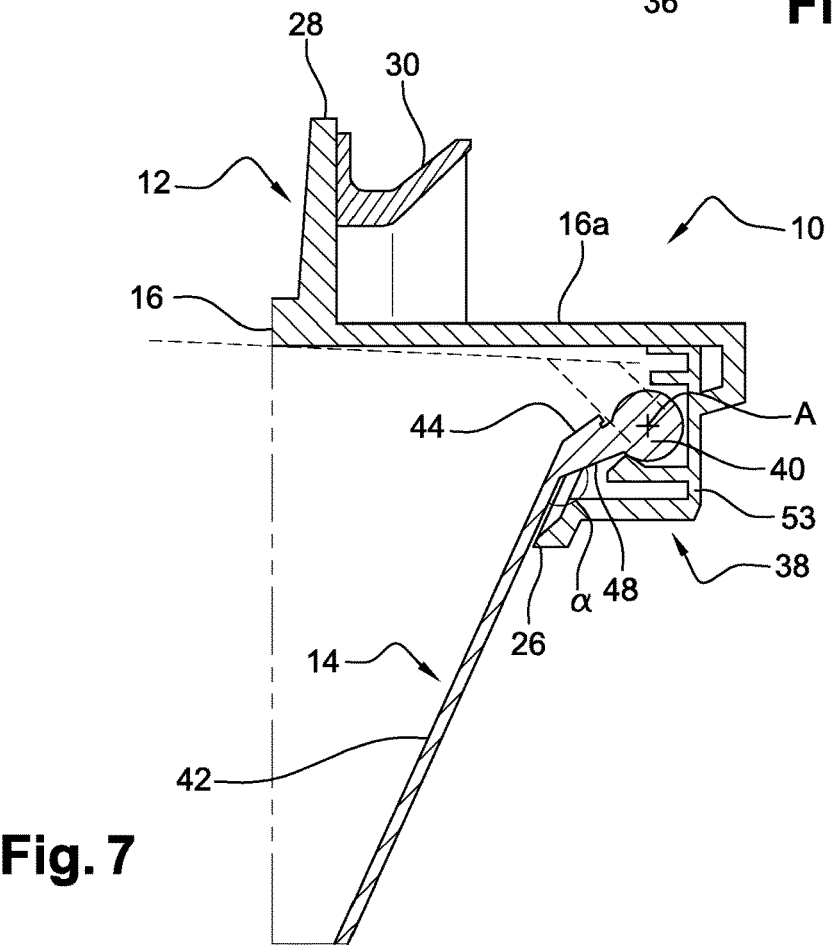

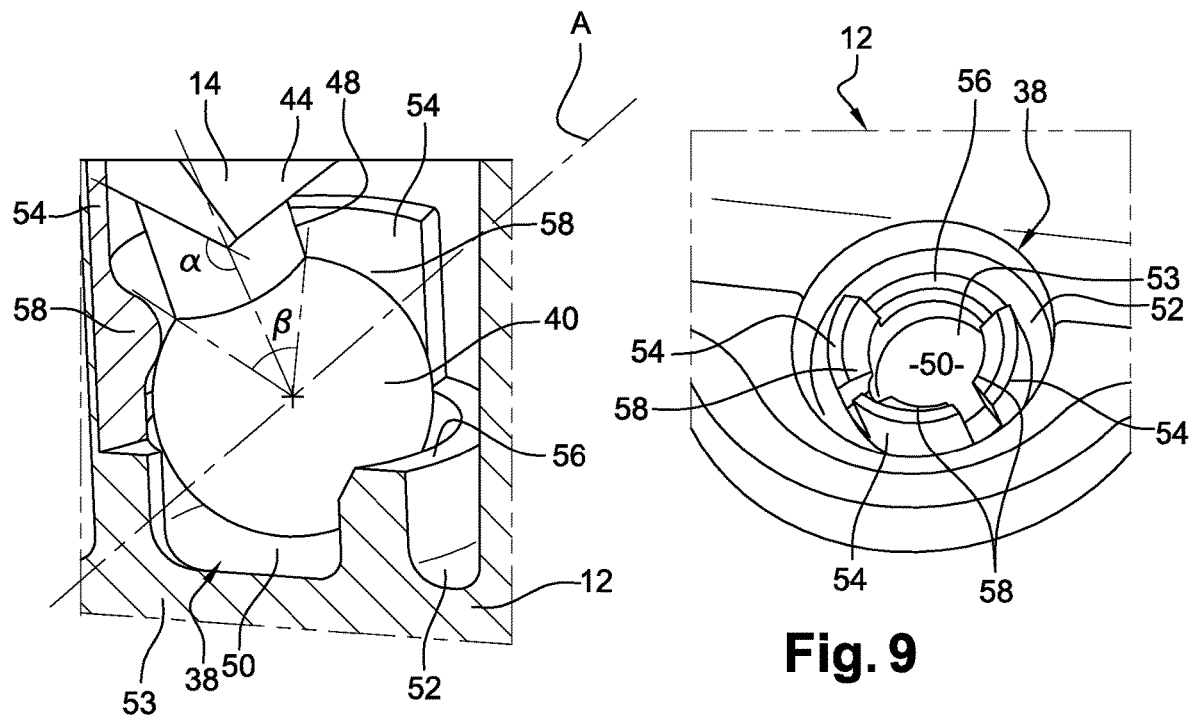
Fig. 8
Fig. 9
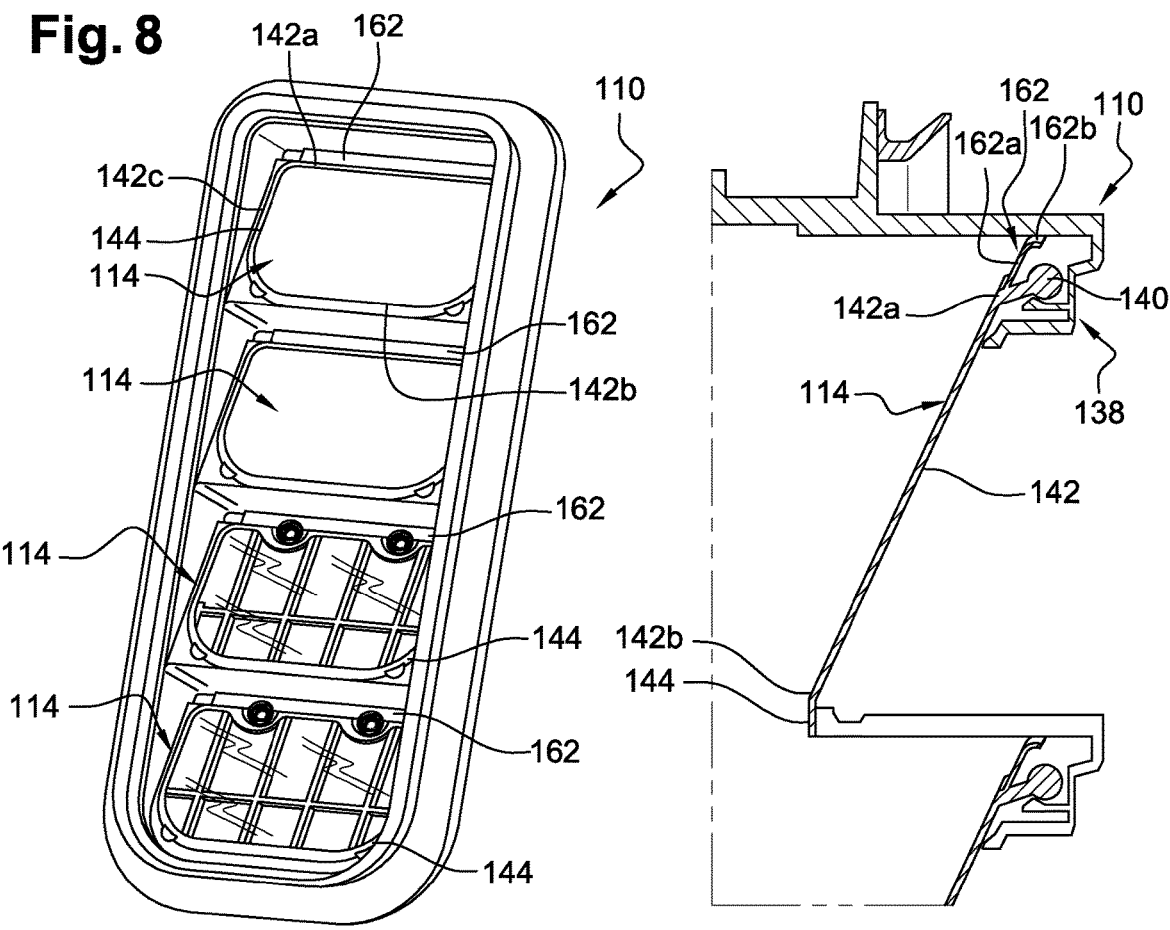
Fig. 10
Fig. 11

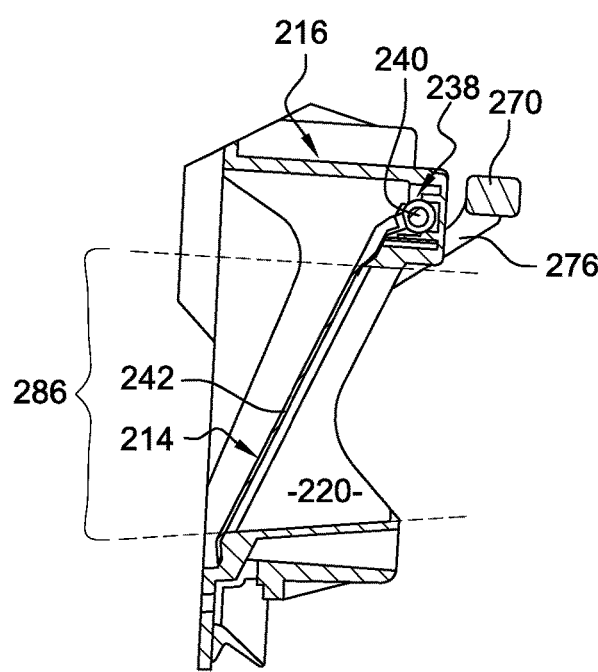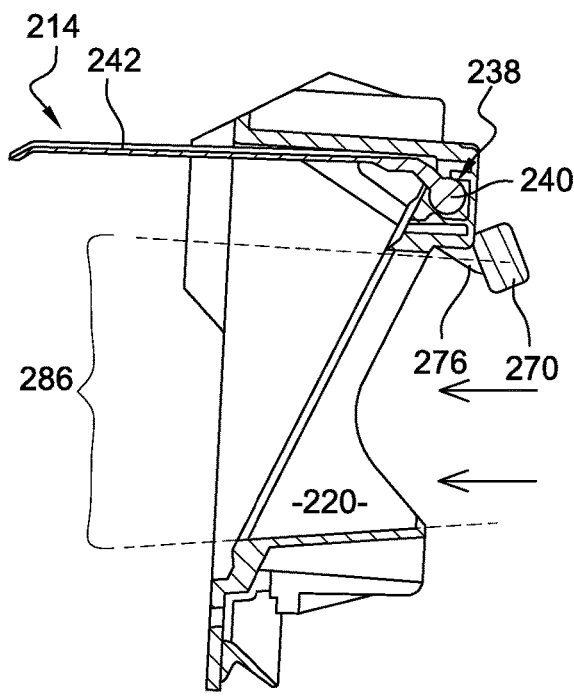
Fig. 20a  Fig. 20b
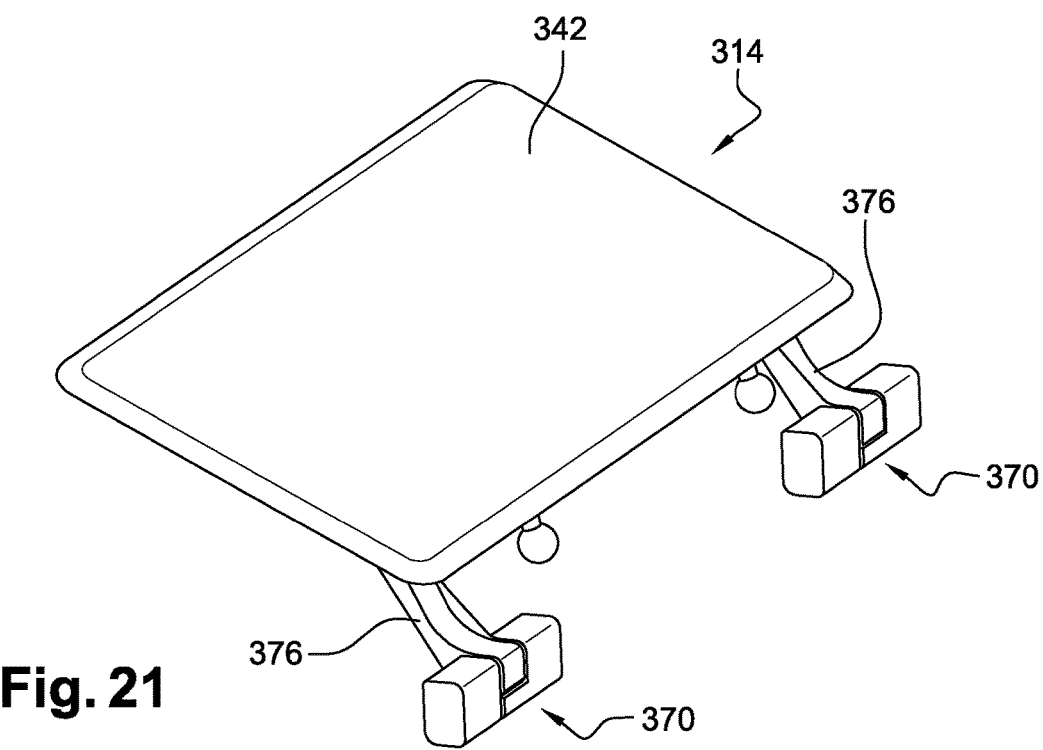
Fig. 21

FLAP WITH A COUNTERWEIGHT FOR AN AIR EXTRACTOR OF A MOTOR VEHICLE

TECHNICAL FIELD

The present invention relates principally to an air extractor, in particular of a motor vehicle.

PRIOR ART

A motor vehicle is currently equipped with one or more air extractors, also known as pressure limitation systems, which make it possible to prevent a significant increase in pressure in the vehicle passenger compartment.

This is principally the case when the air-conditioning or ventilation of the vehicle is used. Air contained in the passenger compartment has to be expelled outside the vehicle in order to prevent the expelled air-conditioning or ventilation air giving rise to an excess pressure in the passenger compartment. This is also the case when a door—side door or hatch—of the vehicle is closed. This closure may give rise to a sudden excess pressure inside the vehicle, which may be unpleasant or even painful, in particular for the ears of a person located in the passenger compartment. It is also the case when a safety air cushion (of airbag type) of a vehicle is activated. The inflated air cushion occupies a significant volume in the passenger compartment, it being necessary for an equivalent volume of air to be expelled immediately from the passenger compartment in order to prevent an excess pressure therein.

It is thus known to provide air extractors, for example at the front and at the rear of a vehicle. Typically, an air extractor comprises a support having at least one opening for the passage of air and at least one flap comprising a wall that is movable from a position of closure of the opening to a position of opening up this opening in order to allow the extraction of a flow of air through the opening.

Two technologies are currently known for air extractor flaps, namely flaps with flexible walls, or membranes, and flaps with rigid walls.

The wall of a flap with a flexible wall is produced from elastic material or from fabric. This wall is attached to the support and is designed to deform through the effect of the air circulating through the opening. The greater the flow of air, the greater the extent of deformation of the wall. Owing to the flexibility of the wall, the deformation thereof is not uniform over its entire length. The drawback of this type of flap is that deformations of its wall are relatively noisy. Indeed, where the air flow is significant, the wall tends to vibrate rapidly, which generates noise nuisances. Furthermore, another drawback of this type of flap is connected with the fact that its wall is not always repositioned in the same way in the position of closure of the opening, which may reduce the efficiency of the extractor. Flaps of this type that were completely twisted and thus totally ineffectual have already been observed.

The wall of a flap with a rigid or semi-rigid wall is produced from plastics. This wall is mounted pivotably on the support and is designed to move by pivoting through the effect of the air circulating through the opening. The greater the flow of air, the more the wall pivots about an axis of pivoting that is generally substantially horizontal. Owing to the stiffness of the wall, it does not deform through the action of the air and remains substantially planar over its entire length. This type of flap does not present the aforesaid drawbacks of a flap with a flexible wall, or membrane.

In the technical field as it stands, a flap with a rigid wall comprises pivot wall articulation means. Document WO A1 2014/070389, for example, discloses a flap comprising a substantially parallelepipedal wall comprising an upper edge and a lower edge connected together by lateral edges. The pivot articulation means are located on the lateral edges of the wall and define an axis of pivoting extending in the plane of the wall. Furthermore, the wall of the flap is connected directly to a counterweight, the axis of pivoting extending between the wall and this counterweight.

The invention proposes an improvement to the above technique that is simple, effective and inexpensive.

Disclosure of the Invention

According to a first aspect, the invention proposes a flap for an air extractor, in particular of a motor vehicle, said flap comprising a rigid or semi-rigid wall and articulation means to allow a pivoting of the flap about an axis substantially parallel to the wall, characterized in that the articulation means are located on a single edge of the wall.

This makes it possible, in the open position of the flap, to leave free the entire opening, unencumbered by the articulation means. Furthermore, the opening may extend over a large part of the extent of the window, which is advantageous.

In the present application, "rigid or semi-rigid wall" will be understood to mean a wall that does not deform when subjected to a flow of air similar to the flow of air passing through an air extractor of a motor vehicle.

"Articulation means", furthermore, will be understood to mean mechanical articulation means as opposed to flexible connection means allowing movement of one component relative to another through deformation of at least one of these components.

The invention also proposes an air extractor, in particular of a motor vehicle, comprising a support having at least one window defining an opening for the passage of air, preferably in a single direction, and at least one flap comprising a rigid or semi-rigid wall and articulation means to allow a pivoting of the flap about an axis substantially parallel to the wall from a position of closure of the opening to a position of opening up this opening, characterized in that the articulation means are located on a single edge of the wall, such as an upper edge of the wall.

The flap and/or the air extractor according to the invention may comprise one or more of the following features, taken in isolation from one another or in combination with one another:

- said rigid wall has a substantially parallelepipedal general form and comprises an upper edge and a lower edge, which are connected together via lateral edges, said articulation means being located on said upper edge of the wall,
- said articulation means comprise at least one swivel element and at least one mechanical rod,
- said articulation means are configured such that the axis of pivoting of the flap is spaced from said wall,
- said articulation means comprise articulation means with swivel element,
- the wall is connected to two elements, such as substantially spherical swivel elements, that are mounted, respectively, in two housings of the support,
- said two elements are two substantially spherical swivel elements,
- said two elements are a substantially spherical swivel element and a substantially mechanical mechanical rod, the wall is connected to the two surivel elements by two arms, respectively, extending in a plane that is inclined relative to the plane of the wall, for example by an angle of between 30 and 60°, the swivel elements are covered by a peripheral protective lip of the wall, extending along said edge, said housings of the support each comprise circumferential tabs that are elastically deformable, in particular in terms of flexing, extending about a spherical or cylindrical cavity for receiving the corresponding swivel element of the flap, the tabs are surrounded by an annular cavity in which the tabs may be deformed, the tabs extend over a circumference smaller than or equal to approximately 300° and/or are separated from one another by circumferential clearances, the tabs comprise, at their free ends, teeth for catching and retaining the corresponding swivel element, a peripheral protective lip extends at least along a part of the periphery of the wall and is preferably inclined relative to the plane in which this wall extends, the wall comprises, for example at at least one of its corners, an extension extending substantially in the plane of the wall, the air extractor comprises a grille in said opening, the support comprises means for bearing on the flap, these bearing means preferably comprising damping studs; this makes it possible to limit the noise generated upon passage of the or each flap in the position of closure of an opening, said damping studs are produced by overmolding on the support and are preferably made as a single component with a peripheral sealing skirt of the support, the air extractor is configured to allow the passage of air in a single direction through said openings.

According to a second aspect, the invention proposes a flap for an air extractor, in particular of a motor vehicle, said flap comprising a rigid or semi-rigid wall, articulation means to allow a pivoting of the flap about an axis substantially parallel to the wall, and at least one counterweight, characterized in that said at least one counterweight is at a distance from said wall and is connected removably to said wall.

In the present application, "counterweight of a movable flap" will be understood to mean a weight opposing that of the wall of the flap in order to modify the balance thereof about an axis of pivoting. It thus acts on the balance of the weights about said axis of pivoting and is advantageously used to facilitate the movements of the flap and, in particular, to accelerate opening thereof and to slow down closing thereof, which allows a reduction in the noise generated at the time of these movements.

According to the invention, the counterweight is offset from the wall of the flap, which makes it possible to position it in an area where it is likely to least impede the passage of air through the opening. Moreover, this allows the opening to extend over a large part of the extent of the window, which was not the case with the prior technique.

The invention also proposes an air extractor, in particular of a motor vehicle, comprising a support having at least one window defining an opening for the passage of air, preferably in a single direction, and at least one flap as described previously, which is movable between a position of closing the opening and a position of opening up this opening.

The flap and/or the air extractor according to the invention may comprise one or more of the following features, taken in isolation from one another or in combination with one another:

said at least one counterweight has an elongate form, the axis of extension thereof being substantially parallel to said wall, the axis of pivoting and the axis of extension are located in a first plane that is inclined relative to the plane of the wall, for example by an angle γ of between 20 and 80°, said at least one counterweight is connected to said wall by at least one connecting arm, said at least one connecting arm extends substantially parallel to said first plane, said at least one counterweight is connected removably to said wall; this facilitates the adjustment of the mass of the counterweight; indeed, the counterweight, and in particular the mass thereof, may be chosen as a function of the specific features required for the air extractor; where, for a particular application, said at least one connecting arm comprises, at a free end, means for catching said at least one counterweight, said at least one counterweight extends in a second plane perpendicular to the plane of the wall and not passing through said wall, said second plane is substantially parallel to an upper edge of said wall, said articulation means, preferably of swivel type, are configured such that the axis of pivoting of the flap is spaced from said wall by a distance smaller than that between said at least one counterweight and said wall, the wall of the flap is located behind the opening and said at least one counterweight of the flap is located in front of the opening, said at least one counterweight is connected to said wall by at least one connecting arm traversing the opening and preferably a grille of the opening, said at least one counterweight is located outside a channel for the passage of air in said opening, in at least one position of the flap about said axis of pivoting, and preferably in the position of closure of the corresponding opening, the wall is connected to two elements, such as two substantially spherical swivel elements mounted, respectively, in two housings of the support, said housings of the support each preferably comprising circumferential tabs that are elastically deformable, in particular in terms of flexing, extending about a spherical or cylindrical cavity for receiving the corresponding element of the flap.

The flap and/or the air extractor according to the first aspect of the invention may comprise one or more of the features relating to the second flap and/or the air extractor according to the second aspect of the invention, and conversely the flap and/or the air extractor according to the first aspect of the invention may comprise one or more of the features relating to the flap and/or to the air extractor according to the first aspect of the invention.

DESCRIPTION OF THE FIGURES

The invention will be better understood and further details, features and advantages of the invention will become apparent on reading the following description given by way of non-limiting example with reference to the appended drawings, in which:

FIGS. 5 and 6 are partial schematic views in perspective and in section of the air extractor of FIGS. 1 and 2, a flap being in the closed position in FIG. 5 and being removed in FIG. 6;

FIG. 7 is a partial schematic view in section of the air extractor of FIGS. 1 and 2, the flap being in the closed position;

FIG. 8 is a schematic view on a larger scale of a swivel element of a flap of the air extractor of FIGS. 1 and 2;

FIG. 9 is a schematic view on a larger scale of a housing of the support of the air extractor of FIGS. 1 and 2;

FIG. 10 is a view corresponding to that of FIG. 1 and showing a variant embodiment of the air extractor according to the invention;

FIG. 11 is a partial schematic view in section of the air extractor of FIG. 10, the flaps being in the closed position;

FIGS. 20a and 20b are partial schematic views in section of the air extractor of FIG. 12, the door being closed in FIG. 20a and open in FIG. 20b;

FIG. 21 is a schematic view in perspective of a flap of an air extractor according to a further variant embodiment of the invention;

DETAILED DESCRIPTION

In the following description, the terms "vertical" and "horizontal", and also "upper", "lower", "lateral", "left" and "right", refer to the position of the air extractor in use, i.e. when it is mounted in a motor vehicle.

Reference is made, first, to FIGS. 1 to 9, which show a first embodiment of the air extractor 10 according to the aforesaid first aspect.

This air extractor 10, also known as a pressure limitation system, is mounted in a motor vehicle to allow the passage of air in one direction. In the present application, the terms "front" and "rear", and also "upstream" and "downstream", refer to the flow of air through the extractor 10. The air flows from the front or from upstream toward the rear or toward downstream, i.e. from the inside to the outside of the vehicle, in order to prevent an excess pressure in the passenger compartment of the vehicle, as explained in the preceding text.

Figure 1:
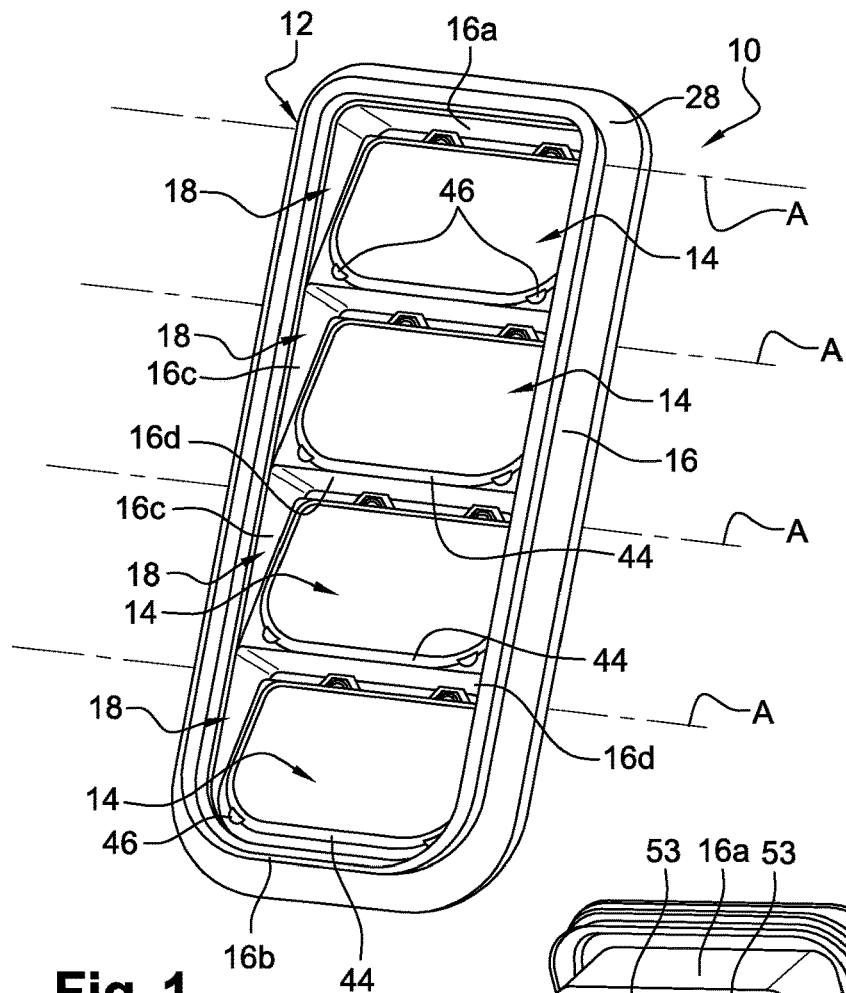
FIGS. 1 and 2 are schematic views in perspective of an air extractor according to the invention, viewed, respectively, from the rear and from the front, this air extractor comprising flaps that are in the closed position here.
Figure 2:
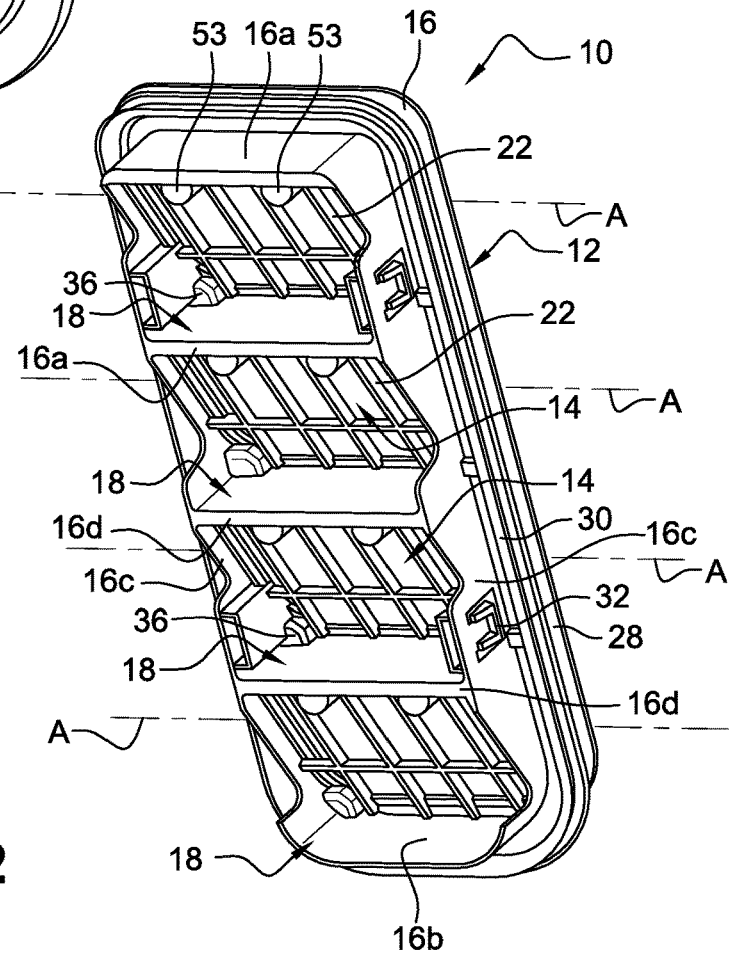
Figure 3:
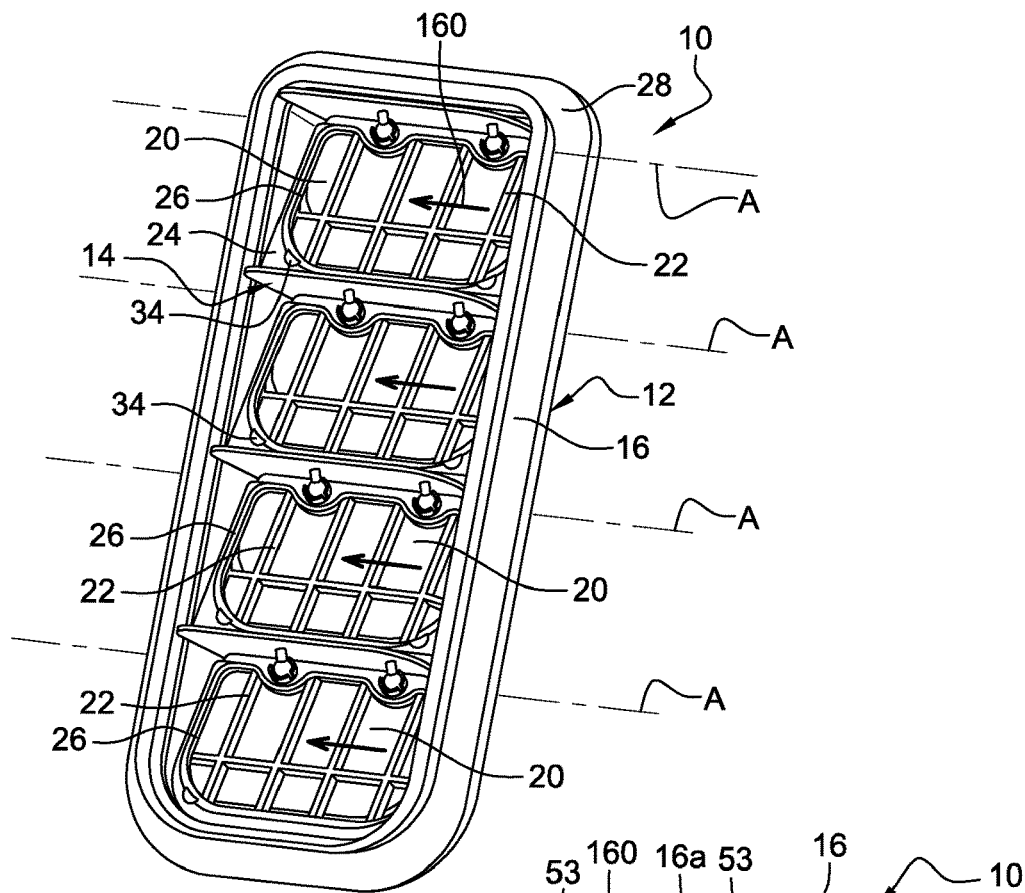
FIGS. 3 and 4 are further schematic views in perspective of the air extractor of FIGS. 1 and 2, viewed, respectively, from the rear and from the front, the flaps of the air extractor being in the open position here.
Figure 4:
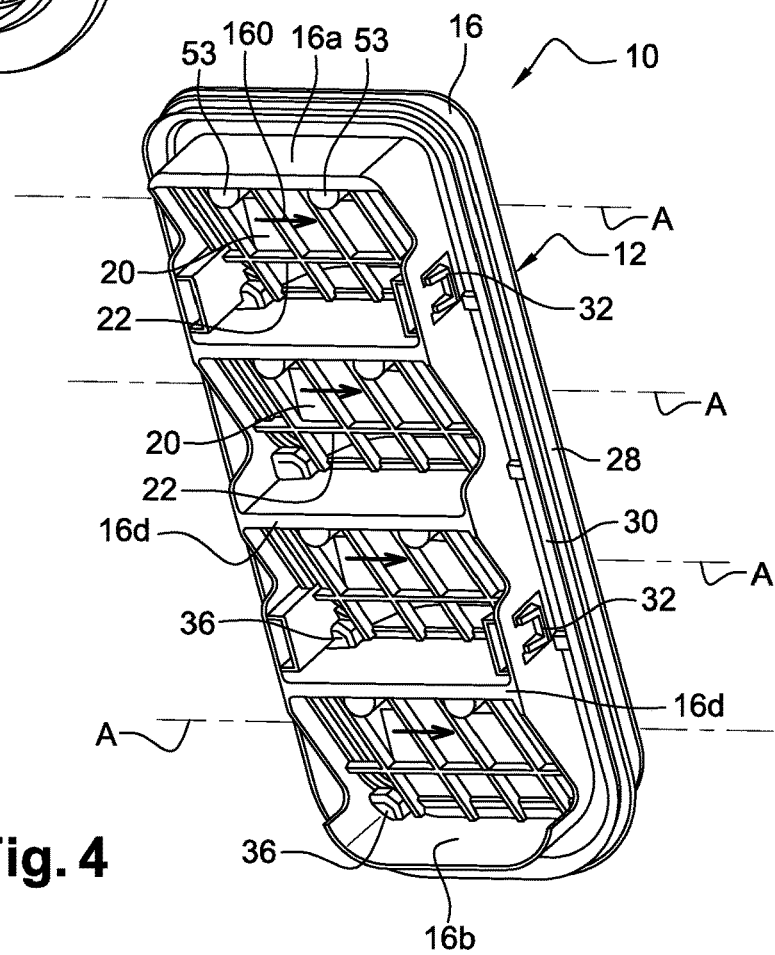

FIGS. 2 and 4 show the front face of the extractor 10 and FIGS. 1 and 3 show the rear face of the extractor. In the example shown, and as will be described in greater detail below, the extractor is designed to be mounted in an orifice in a part of the vehicle by translation from rear to upstream. This, however, is non-limiting, and the converse may be envisaged.

The air extractor 10 essentially comprises a support 12 and movable flaps 14.

In the example shown, the support 12 comprises a peripheral frame 16 comprising compartments or windows 18, which are four in number here. However, a number of windows 18 greater than or less than four and, for example, a single window, may be envisaged.

The air extractor 10 here has an elongate form in the vertical direction, its windows 18 being arranged one above the other. Each window 18 comprises an opening 20 for the passage of air. The opening 20 here comprises a grille 22 that is, however, optional. The grille 22 here comprises substantially parallel and vertical bars or fins and at least one substantially perpendicular and horizontal bar or fin.

The peripheral frame 16 of the support 12 comprises an upper wall 16a and a lower wall 16b, which are substantially parallel and horizontal, and two substantially parallel and vertical lateral walls 16c. The lateral walls 16c are connected together by the walls 16a, 16b and also by crosspieces 16d, which are three in number in the example shown, and which are substantially parallel and horizontal. The walls 16a, 16b, 16c and the crosspieces 16d of the frame 16 together define the windows 18.

The opening 20 of each window 18 is here formed in a wall 24 that is inclined and extends substantially between the front end of the wall 16a or of a crosspiece 16d and the rear end of another crosspiece or of the wall 16b. The walls 24 are thus not coplanar but extend in parallel planes. The grilles 22 extending in the openings 20 are likewise not coplanar.

A peripheral lip 26 preferably extends over at least part of the contour of each opening 22, on the rear or downstream side (FIGS. 3 and 6).

The peripheral frame 16 of the support 12 further comprises a peripheral lip 28 extending preferably over the entire perimeter of the frame, as may be seen in FIGS. 1 and 3. This lip 28 forms a means of bearing on and of positioning of the extractor 10, which is configured in order to interact with a peripheral edge of the aforesaid orifice of the part of the vehicle in which the extractor 10 is designed to be mounted. Preferably, an elastic peripheral skirt 30 is located in front of the lip 28 in order to interact with said peripheral edge and to provide a watertight seal right around the extractor. It preferably extends over the entire perimeter of the frame, as may be seen in FIGS. 2 and 4.

The frame 16 further comprises means 32 for fastening to the part of the vehicle, which here comprise elastic snap-fit means, i.e. means designed to interact by deformation and elastic return with complementary means of the part of the vehicle in order to hold the extractor relative to this part of the vehicle. The means 32 are here located on the lateral walls 16c of the frame and, in the example shown (FIGS. 2 and 4) are four in number.

As stated above, the extractor 10 is designed to be mounted in the orifice of the part of the vehicle by translation from rear to upstream until the frame 16 thereof engages in the orifice, its skirt 30 comes to bear on the peripheral edge of the orifice, and its fastening means 32 interact with this peripheral edge. In the variant in which the extractor is to be mounted in the orifice of the vehicle by translation from front to rear, its elastic skirt 30 would then be located behind the lip 28 (and not in front, as in the example shown).

The skirt 30 may be formed from an elastically deformable material that is different from that of the frame 16, the latter preferably being formed from a rigid or semi-rigid plastic. The skirt 30 may be formed by overmolding on the frame. In a particular illustrative embodiment of the invention, the frame 16 is made from PP (polypropylene) and the skirt may be based on EPDM (ethylene propylene diene monomer).

As may be seen in FIG. 3, the rear face of each wall 24 may comprise damping studs 34, one of which can be better seen in FIG. 6. Each damping stud 34 projects from the wall 24 in order to form a means of bearing on and of damping of a flap 12 of the extractor 10, as will be described below. Each wall 24 here comprises two studs 34 located, respectively, at the right and left lower corners of the wall 24. They are located in the immediate vicinity of the aforesaid peripheral lip 26.

The studs 34 are preferably formed from an elastically deformable material that may be the same as that of the skirt 30. The studs 34 may be formed by overmolding on the frame. Advantageously, the studs 34 and the skirt 30 are formed simultaneously by overmolding. The studs 34 are then connected by material connections (not shown) to the skirt 30 in such a manner that the studs and the skirt are monoblock. In the example shown, the frame 16 comprises internal channels, formed in excess thicknesses 36 of material (cf. FIGS. 2 and 4), which open out, on the one hand, on external faces of the walls 16a, 16b, 16c and, on the other, on the rear faces of the walls 24. Each internal conduit extends between an orifice located on the rear face of one of the walls 24 and an external face of one of the walls 16a, 16b, 16c. It can be seen in FIGS. 2 and 4 that the excess thicknesses 36 of material are located on the upper faces of the crosspieces 16d and of the wall 16b, on either side thereof.

The flaps 14 are movable by pivoting relative to the support 12 that comprises the housings 38 for receiving articulation means of the flaps, which here are articulation means with the swivel element 40.

The number of flaps 14 of the extractor 10 is equal in number to the windows 18 thereof, and thus here there are four. Each flap 14 essentially comprises a rigid or semi-rigid wall 42 and articulation means with swivel element 40.

The wall 42 here has a thin (for example, less than or equal to 1 mm) parallelepipedal general form. It is substantially planar and comprises an upper edge 42a, a lower edge 42b and lateral edges 42c substantially perpendicular to the edges 42a, 42b.

The wall 42 has a form and dimensions close to those of the corresponding opening 20 in order to be able to close off the opening in the position of closure of the flap 14.

Each wall 42 comprises a peripheral lip 44 extending advantageously over the entire perimeter of the wall 42 and designed to come to bear on the peripheral lip 26 of the opening 20 (cf. FIG. 5). This lip 44 is preferably inclined relative to the plane of the wall 42, here toward the front.

Each wall 42 further comprises at least one tab or extension 46 at each of the right and left lower corners thereof (cf. FIGS. 1 and 5). These extensions 46 extend substantially in the plane of the wall 42 and are designed to come to bear on the damping studs 34 of the support when the flap 14 is in the closed position shown in FIG. 5.

According to the first aspect of the invention, the articulation means with swivel element 40 are located on a single edge of the wall 42, namely the upper edge 42a in the example shown.

The articulation means with swivel element 40 of each flap 14 define an axis A of pivoting of the flap substantially parallel to the plane of the wall 42. Advantageously, this axis A is at a distance or spaced from the wall 42, as may be seen in FIGS. 5 and 7, toward the front here.

The articulation means of each flap 14 comprise two swivel elements 40 in the example shown. The swivel elements 40 of each flap 14 are at a distance from one another. They are each connected to the upper edge 42a of the corresponding wall 42 by a connecting arm 48.

Each connecting arm 48 has an elongate and cylindrical general form (FIGS. 7 and 8) and comprises a longitudinal end connected to the rear face of the wall 42, at the upper edge 42a thereof, and an opposite longitudinal end connected to the corresponding swivel element 40. The (longitudinal axes of the) arms 48 extend in a plane inclined relative to the plane of the wall 42, for example by an angle $\alpha$ of between 30 and 60°.

Each swivel element 40 is formed by a sphere or sphere portion. As may be seen in FIG. 7, the swivel elements 40 are here not covered by the wall 42 or by the peripheral lip 44 thereof. Each swivel element 40 has a diameter greater than that of the connecting arm thereof. It defines a spherical surface extending, in section, over a circumference representing an angle $\beta$ at least equal to 300°.

Each flap 14 is here formed as a single component. The flaps 14 may be formed from PP.

FIGS. 8 and 9 show a housing 38 for receiving a swivel element 40, the support 12 comprising two housings 38 in each window 18, as may be seen in FIGS. 2 and to 4.

Each housing 38 has a circular general form and comprises a first, cylindrical or spherical, cavity 50 and a second, annular, cavity 52 extending around the spherical cavity 50 and spaced radially therefrom, relative to the center or to the longitudinal axis of the first cavity 50. The cavity 50 of each housing is closed at the front by a back wall 53, which may be seen in FIGS. 2, 4 and 7 to 9. The back wall 53 makes it possible to seal the housing 38.

In the annular space extending between the cavities 50, are circumferential tabs 54 that are elastically deformable, in particular in terms of flexing. These tabs 54 are three in number here and have substantially the same angular extent about the center or about the longitudinal axis of the first cavity 50. The tabs 54 are at a distance circumferentially from one another, separated by circumferential clearances, and are arranged circumferentially one beside the other such that together they extend over a circumference smaller than or equal to approximately 300°.

Among the three tabs 54 there is one lower or intermediate tab and two lateral tabs. It will thus be understood that the housing does not comprise an upper tab, i.e. the circumferential zone in which there is no tab 54 is located at the top of the housing, as may be seen in the drawings.

The front ends of the tabs 54 are connected to an annular lip 56 common to the three tabs and the tabs each comprise at their rear or free ends a projecting tooth 58 catching the corresponding swivel element 40.

Each tooth 58 is oriented radially toward the interior of the cavity 50.

The tabs 54 can be deformed by flexing and are each designed to move in a plane passing through the center or the axis of the cavity 50. The cavity 52 is designed to allow these deformations, the free or rear ends of the tabs 54 being designed to come into this cavity when deformations take place.

The swivel elements 40 are mounted in the housings 38 by means of elastic snap-fitting. The swivel elements are engaged forcibly in the housings 38 and, in particular, in the cavities 50. The swivel elements 40 then bear on the teeth 58 of the tabs, which are preferably beveled, in order to force the tabs to deform elastically by moving radially in the cavity 52. The swivel elements 40 then slide on the teeth 58 until they penetrate the cavity 50. The tabs 54 then substantially resume their original position. The swivel elements 40 are then held in the cavities by the teeth 58, as may be seen in FIG. 8. In this position, the swivel elements 40 are able to turn in the cavities 50 while remaining held in these cavities by the teeth 58 of the tabs 54. Advantageously, the swivel elements allow a pivoting of the flap 14 about the axis A through an angle of between approximately 30 and 80° (angular displacement).

As may be seen in FIG. 7, the position of closure of each flap 14 is defined by bearing of the flap and, in particular, of the peripheral lip 44 thereof and of the extensions 46 thereof, respectively, on the lip 26 and the studs 34 of the corresponding wall 24. As may also be seen in broken lines in FIG. 7, the (maximum) position of opening of each flap 14 may be defined by bearing of the flap and, in particular, of the wall 42 thereof on the wall 16a or the crosspiece 16d located just above this flap. In this position of opening, which may also be seen in FIGS. 3 and 4, all the openings 20 are freed in order to be traversed by flows of air circulating from the front toward the rear (arrows 60). These flows of air apply a sufficient force to the flaps and, in particular, to the front faces of the walls 42 thereof in order to cause same to pivot about the axes A.

Reference is now made to FIGS. 10 to 11, which show a variant embodiment of the air extractor 110, still according to the aforesaid first aspect.

This variant comprises all the features of the first embodiment described above and comprises an additional feature described below.

The wall 142 of each flap 114 further comprises a capping piece 162 at its upper edge 142a, covering the swivel elements 140 as may be seen in FIG. 11. This capping piece 162 extends over substantially the entire length of the upper edge of the wall, at a distance from the swivel elements 140. It comprises a rectilinear wall 162a extending upward in the extension of the wall 142 and connected to an inclined lip 162b similar to the peripheral lip 144 extending along the other edges 142b, 142c of the wall 142. This capping piece 162 principally has the function of protecting the swivel elements 140 and their extensions 138, in particular from the risk of fouling.

Reference is now made to FIGS. 12 to 19, which show a further variant embodiment of the air extractor 210 according to the aforesaid first and second aspects.

Figure 12:
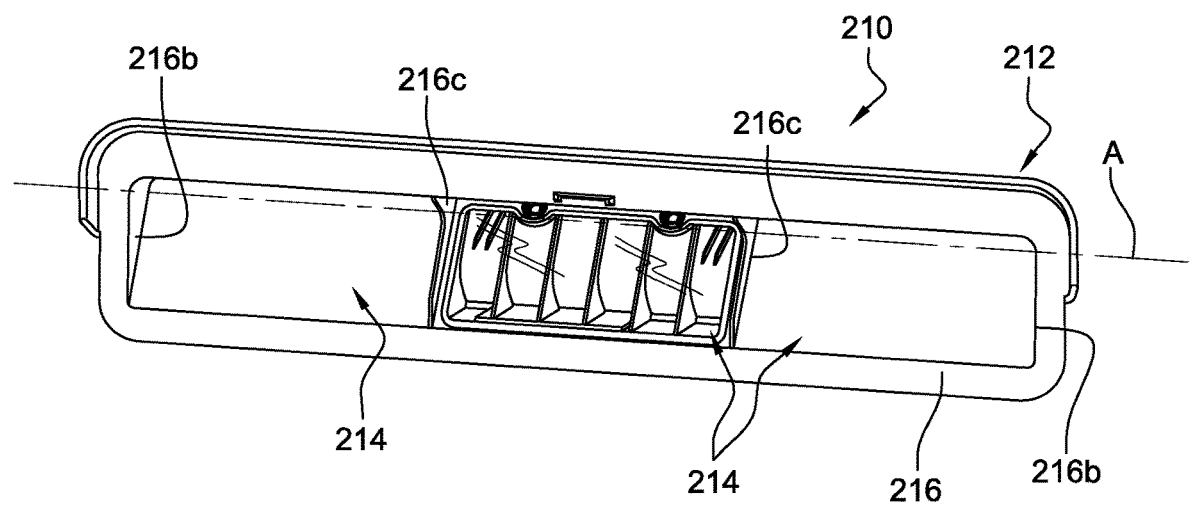
FIG. 12 is a schematic view in perspective of a further variant embodiment of the air extractor according to the invention, viewed from the rear, this air extractor comprising flaps in the closed position here, one of which flaps is visible transparently.
Figure 13:
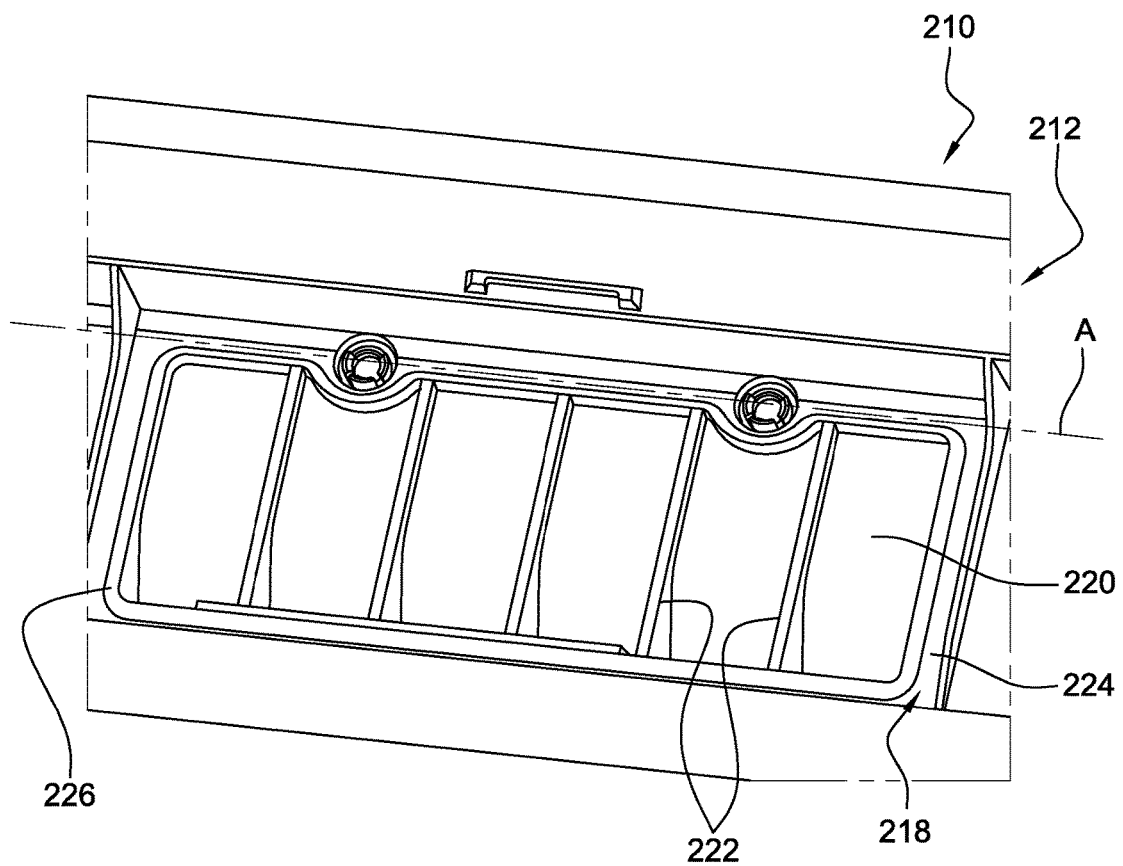
FIG. 13 is a partial view on a larger scale of the support of the air extractor of FIG. 12, viewed from the rear.
Figure 14:
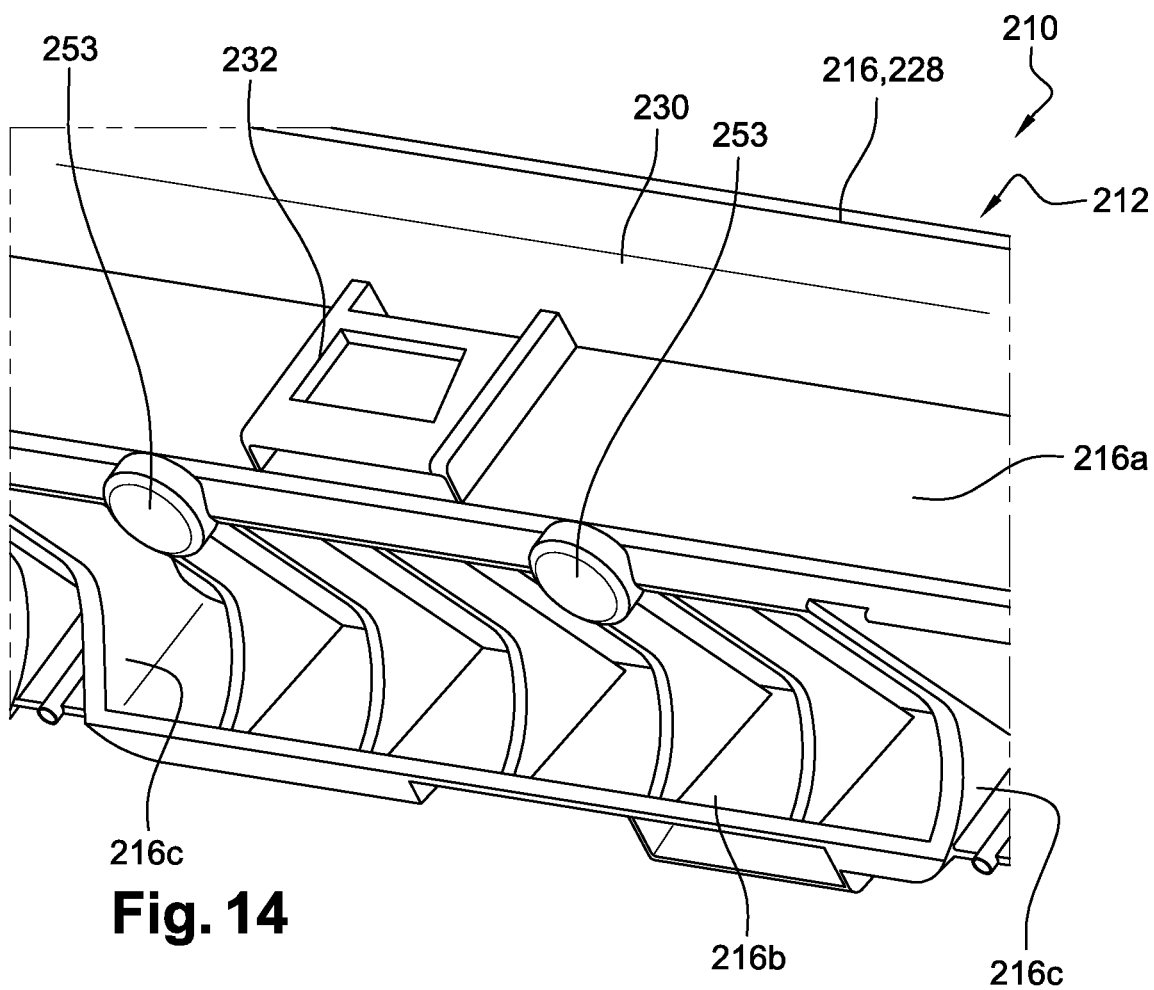
FIG. 14 is a partial view on a larger scale of the support of the air extractor of FIG. 12, viewed from the front.

FIG. 14 shows the front face of the extractor 210 and FIGS. 12 and 13 show the rear face of the extractor. In the example shown, and as will be described in greater detail below, the extractor is designed to be mounted in an orifice in a part of the vehicle by translation from rear to upstream. This, however, is non-limiting, and the converse may be envisaged, as explained above.

The air extractor 210 comprises a support 212 and movable flaps 214.

In the example shown, the support 212 comprises a peripheral frame 216 comprising compartments or windows 218, which are three in number here. However, a number of windows 218 greater than or less than three and, for example, a single window, may be envisaged.

The air extractor 210 here has an elongate form in the horizontal direction, its windows 218 being arranged one beside the other. Each window 218 comprises an opening 220 for the passage of air. The opening 220 here comprises a grille 222, which is, however, optional. The grille 222 here comprises substantially parallel and vertical bars or fins.

The peripheral frame 216 of the support 212 comprises an upper wall 216a and a lower wall 216b, which are substantially parallel and horizontal, and two substantially parallel and vertical lateral walls 216c. The lateral walls 216c are connected together by the walls 216a, 216b and also by crosspieces 216d, which are two in number in the example shown and which are substantially parallel and vertical. The walls 216a, 216b, 216c and the crosspieces 216d of the frame 216 together define the windows 218.

The opening 220 of each window 218 is here formed in a wall 224 that is inclined and extends substantially between the front end of the wall 216a and the rear end of the wall 216b. The walls 224 are coplanar. The grilles 222 extending in the openings 220 are likewise coplanar.

A peripheral lip 226 preferably extends over at least part of the contour of each opening 222, on the rear or downstream side (FIG. 13).

The peripheral frame 216 of the support 212 further comprises a peripheral lip 228 extending preferably over the entire perimeter of the frame, as may be seen in FIG. 1. This lip 228 forms a means of bearing and of positioning of the extractor 210, which is configured in order to interact with a peripheral edge of the aforesaid orifice of the part of the vehicle in which the extractor 210 is designed to be mounted. Preferably, an elastic peripheral skirt 230 is located in front of the lip 228 in order to interact with said peripheral edge and to provide an airtight seal right around the extractor. It preferably extends over the entire perimeter of the frame.

The frame 216 further comprises means 232 for fastening to the part of the vehicle, which here comprise elastic snap-fit means, i.e. means designed to interact by deformation and elastic return with complementary means of the part of the vehicle in order to hold the extractor relative to this part of the vehicle. The means 232 are here located on the walls 216a, 216b of the frame and are preferably four in number (FIGS. 13 and 14).

As stated above, the extractor 210 is designed to be mounted in the orifice of the part of the vehicle by translation from rear to upstream until the frame 216 thereof engages in the orifice, its skirt 230 bears on the peripheral edge of the orifice, and its fastening means 232 interact with this peripheral edge. In the variant in which the extractor is to be mounted in the orifice of the vehicle by translation from front to rear, its elastic skirt 230 would then be located behind the lip 228 (and not in front, as in the example shown).

The skirt 230 may be formed from an elastically deformable material that is different from that of the frame 216, the latter preferably being formed from a rigid or semi-rigid plastic. The skirt 230 may be formed by overmolding on the frame. In a particular illustrative embodiment of the invention, the frame 216 is made from PP (polypropylene) and the skirt may be based on EPDM (ethylene propylene diene monomer).

The flaps 214 are movable by pivoting relative to the support 212 that comprises housings 238 for receiving articulation means of the flaps, which here are articulation means with swivel elements 240.

The number of flaps 214 of the extractor 210 is equal in number to the windows 218 thereof, and thus here there are three. Each flap 214 essentially comprises a rigid or semi-rigid wall 242 and articulation means with swivel element 240.

The wall 242 here has a thin (for example, less than or equal to 1 mm) parallelepipedal general form. It is substantially planar and comprises an upper edge 242a, a lower edge 242b and lateral edges 242c substantially perpendicular to the edges 242a, 242b.

The wall 242 has a form and dimensions close to those of the corresponding opening 220 in order to be able to close off the opening in the position of closure of the flap 214.

Each wall 242 comprises a peripheral lip 244 extending advantageously over the entire perimeter of the wall 242 and designed to come to bear on the peripheral lip 226 of the opening 220. This lip 244 is preferably inclined relative to the plane of the wall 242, here toward the front.

According to the first aspect of the invention, the articulation means with swivel element 240 are located on a single edge of the wall 242, namely on the upper edge 242a in the example shown.

The articulation means with swivel element 240 of each flap 214 define an axis A of pivoting of the flap substantially parallel to the plane of the wall 242. Advantageously, this axis A is at a distance or spaced from the wall 242, as may be seen in FIGS. 16 to 19, toward the front here.

The articulation means of each flap 214 comprise two swivel elements 240 in the example shown. The swivel elements 240 of each flap 214 are at a distance from one another. They are each connected to the upper edge 242a of the corresponding wall 242 by a connecting arm 248.

Each connecting arm 248 has an elongate and cylindrical general form (FIGS. 16 to 19) and comprises a longitudinal end connected to the rear face of the wall 242, at the upper edge 242a thereof, and an opposite longitudinal end connected to the corresponding swivel element 240. The (longitudinal axes of the) arms 248 extend in a plane inclined relative to the plane of the wall 242, for example by an angle α of between 30 and 60°.

Each swivel element 240 is formed by a sphere or sphere portion. As may be seen in FIGS. 16 and 19, the swivel elements 240 are here not covered by the wall 242 or by the peripheral lip 244 thereof. Each swivel element 240 has a diameter greater than that of the linking arm 248 thereof. It defines a spherical surface extending, in section, over a circumference representing an angle β at least equal to 300°.

Figure 15:
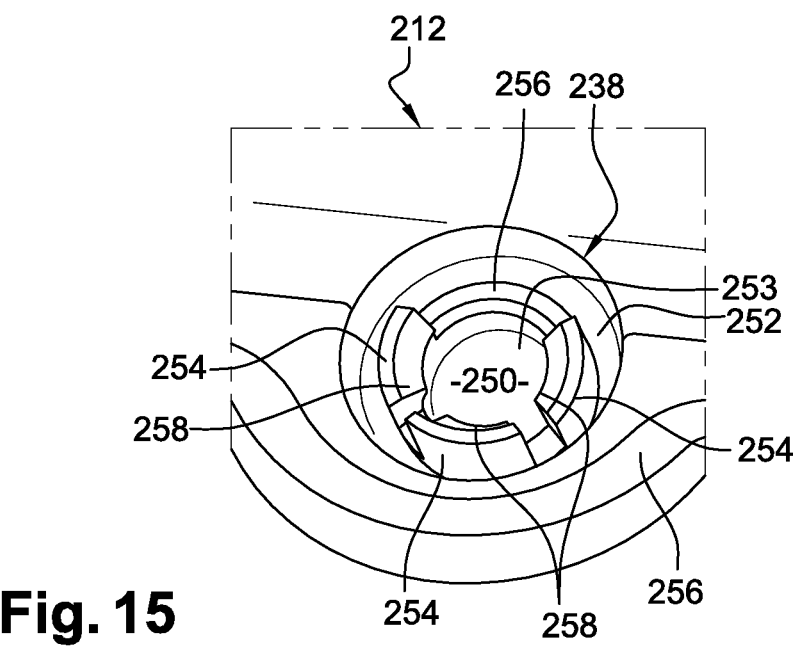
FIG. 15 is a schematic view of a housing of the support of the air extractor of FIG. 12.
Figure 19:
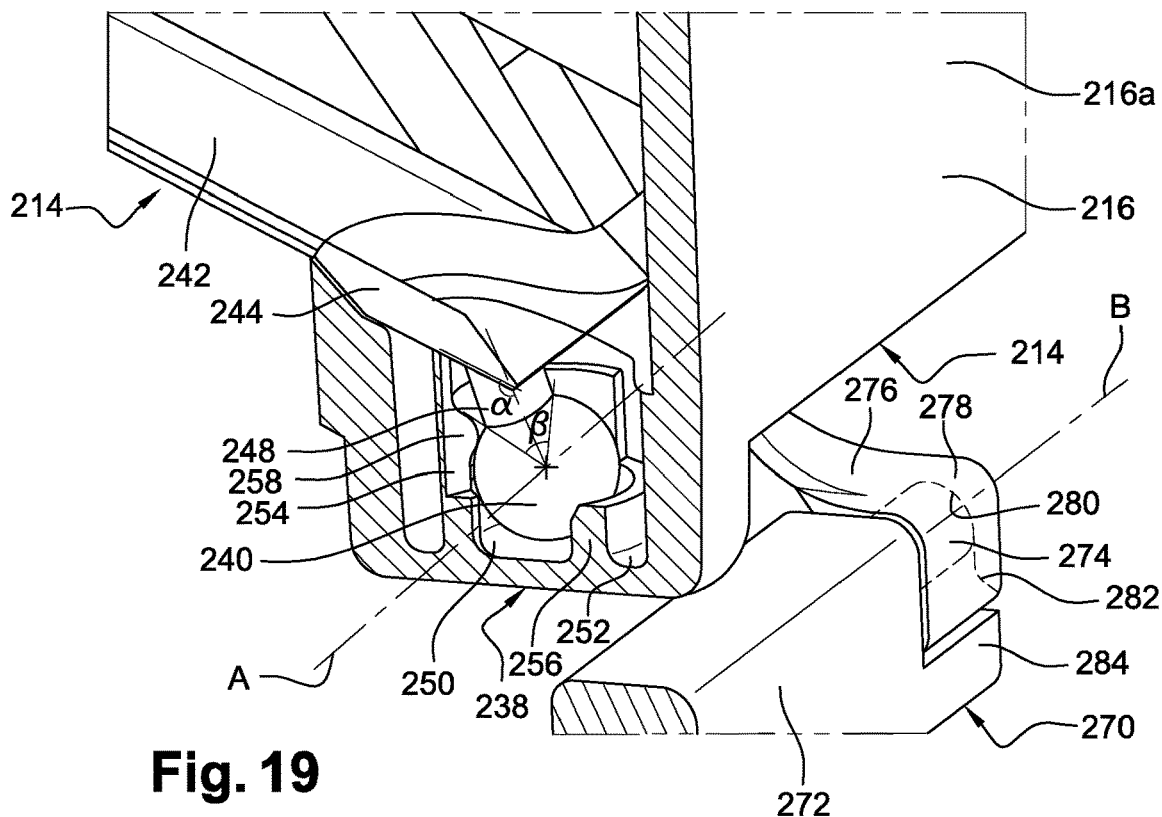
FIG. 19 is a view on a larger scale of a detail of FIG. 18.

FIGS. 15 and 19 show a housing 238 for receiving a swivel element 240, the support 212 comprising two housings 238 in each window 218, as may be seen in FIG. 13.

Each housing 238 has a circular general form and comprises a first, cylindrical or spherical, cavity 250 and a second, annular, cavity 252 extending around the spherical cavity 250 and spaced radially therefrom, relative to the center or to the longitudinal axis of the first cavity 250. The cavity 250 of each housing is closed at the front by a back wall 253, which may be seen principally in FIGS. 13 to 15. The back wall 253 makes it possible to seal the housing 238.

In the annular space extending between the cavities 250, 252 are circumferential tabs 254 that are elastically deformable, in particular in terms of flexing. These tabs 254 are three in number here and have substantially the same angular extent about the center or about the longitudinal axis of the first cavity 250. The tabs 254 are at a distance circumferentially from one another, separated by circumferential clearances, and are arranged circumferentially one beside the other such that together they extend over a circumference smaller than or equal to approximately 300°.

Among the three tabs 254 there is one lower or intermediate tab and two lateral tabs. It will thus be understood that the housing does not comprise an upper tab, i.e. the circumferential zone in which there is no tab 254 is located at the top of the housing, as may be seen in the drawings.

The front ends of the tabs 254 are connected to an annular lip 256 common to the three tabs and the tabs each comprise at their rear or free ends a projecting tooth 258 catching the corresponding swivel element 240. Each tooth 258 is oriented radially toward the interior of the cavity 250.

The tabs 254 can be deformed by flexing and are each designed to move in a plane passing through the center or the axis of the cavity 250. The cavity 252 is designed to allow these deformations, the free or rear ends of the tabs 254 being designed to come into this cavity when deformations take place.

According to the second aspect of the invention that can be seen principally in 16 to 19, each flap 214 of the extractor 210 is equipped with at least one counterweight 270.

Each counterweight 270 has an elongate, rectilinear form and thus extends along an axis of extension B. This axis of extension B is here parallel to the plane of the wall 242 and, more particularly, parallel to the upper edge 242a thereof.

Each counterweight 210 comprises a parallelepipedal block 272 of elongate form and comprising a fastening finger 274 at each of its longitudinal ends. The fingers 274 are coaxial and aligned on the axis B. The longitudinal ridges of the block 272 are preferably rounded or chamfered.

The block 272 is formed, and in particular dimensioned, to confer a specific mass on the counterweight 270, which mass is naturally a function of that of the wall 242 and, for example, less than 10 g, and, for example, between 4 and 8 g.

The counterweight 270 is here attached and fastened to the wall 242, preferably detachably, i.e. removably. In the example shown, the wall 242 comprises two arms 276 connecting to the counterweight.

The arms 276 are located on the front face of the wall 242, at the right and left upper corners thereof, i.e. close to the edges 242a, 242c. As may be seen in the drawings, the swivel elements 242 are located between the arms 276.

Figure 16:
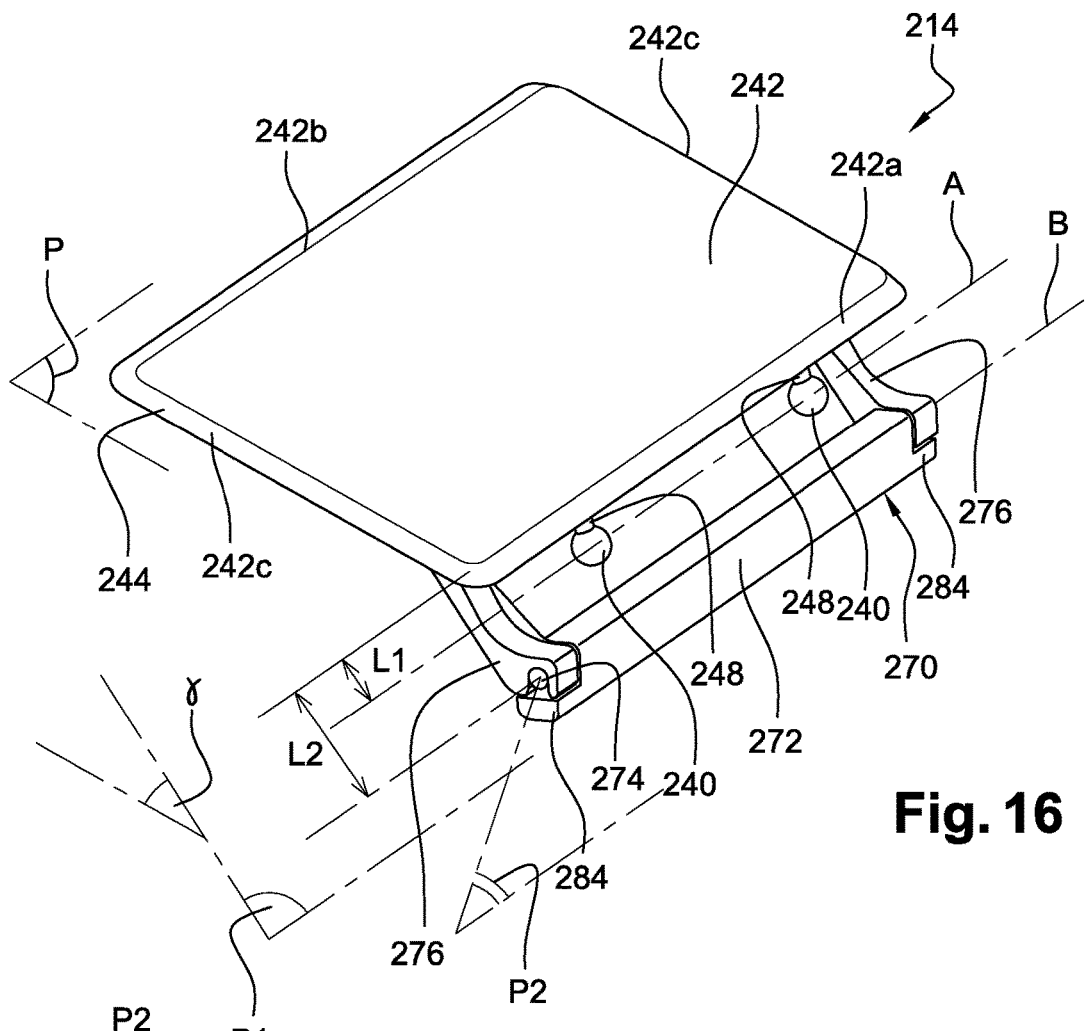
FIGS. 16 and 17 are schematic views in perspective of a flap of the air extractor of FIG. 12, the flap being equipped with a counterweight in FIG. 16 and not equipped with this counterweight in FIG. 17.
Figure 17:
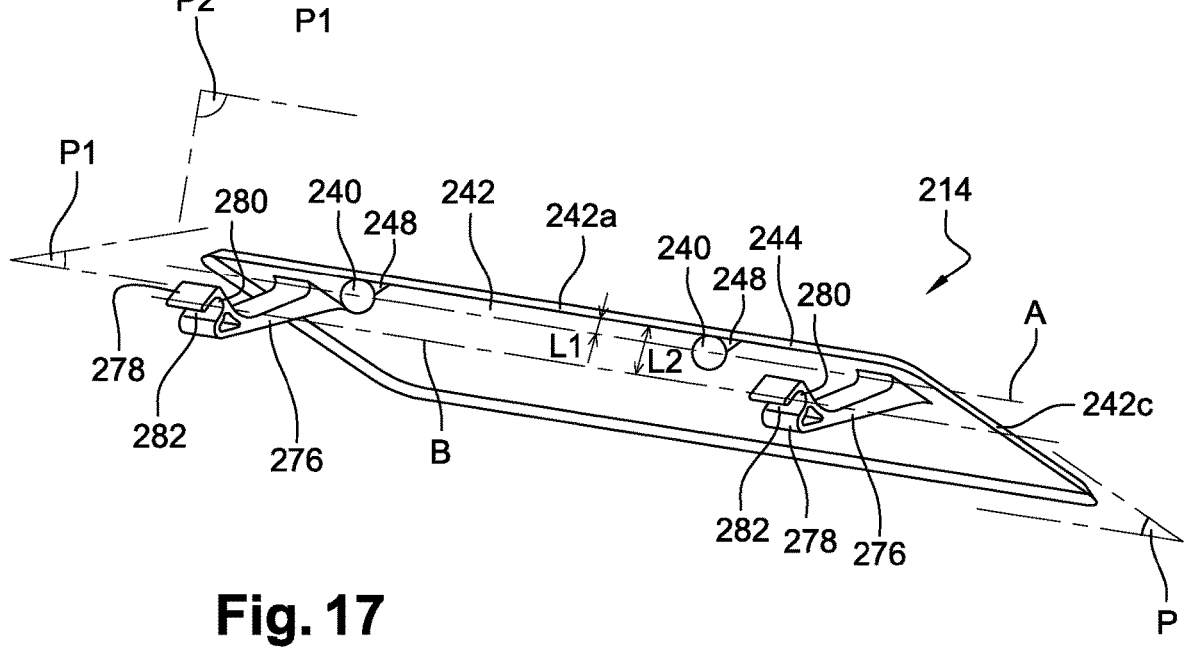
Figure 18:
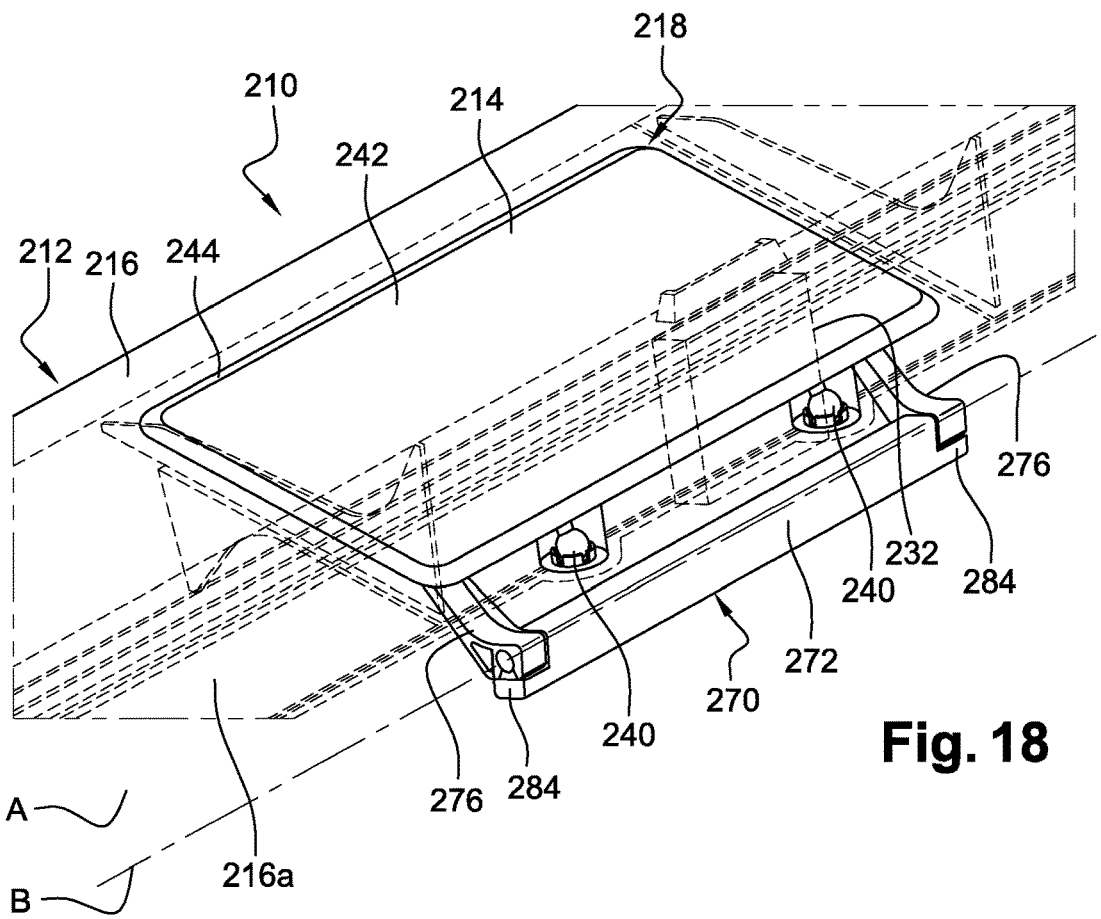
FIG. 18 is a partial view of the air extractor of FIG. 12, one counterweight-equipped flap of which is in the closed position.

Each arm 276 has an elongate form and extends from a longitudinal end connected to the wall 242 as far as an opposite longitudinal end connected to a hook 278 configured in order to interact by elastic snap-fitting with one of the fingers 274 of the counterweight 270, as may be seen in FIGS. 16 and 18.

The hooks 278 each comprise a cylindrical housing 280, of a form complementing that of the finger 274, which opens out at its two longitudinal ends. Each hook 278 further comprises a slot 282 opening out in the housing 280 and through which the finger 274 is able to pass in order to be housed in the housing 280.

As may be seen in the drawings, the arms 276 are inclined relative to the plane of the wall 242. P1 defines the (first) plane passing via the axes A and B. It will be noted that this plane P1 is inclined relative to the plane P of the wall 242 and that the arms 276 are substantially parallel to this plane P1. P2 defines the (second) plane passing via the axis B and substantially perpendicular to the plane of the wall 242. It will be noted that this plane P2 does not pass via the wall 242. The axis B is at a distance L2 from the wall 242, and in particular from the upper edge 242a thereof, this distance L2 being greater than the distance L1 between the axis A and the wall, and in particular the upper edge 242a thereof.

As may be seen, likewise, in the drawings, the counterweight 270 also comprises, at its longitudinal ends, protuberances 284 designed to interact (preferably by complementarity of form) by bearing or by abutment with the hooks 278 of the arms 274 in order to prevent rotation of the counterweight about the axis B.

As may be seen principally in FIG. 18, each flap 214 has its wall 242 that is located to the rear of the opening 220 or of the wall 224 defining this opening, and its counterweight 270 that is located in front of the opening 220 or of the wall 224. The arms 276 pass through the opening 220 and the grille 222.

The wall 242, the arms 276 and the swivel elements 240 of each flap 214 are preferably produced as a single component, for example from PP. The counterweights 270 may likewise be produced from PP.

FIGS. 20a and 20b show the position of the counterweight 270 of each flap 214 when the latter pivots about the axis A. In these figures, the broken lines 286 delimit the flow channel of air through the opening 220 designed to be closed by the flap 214. In the position of closure (FIG. 20a), the counterweight 270 of the flap is located outside the channel 286. The position of closure of each flap 214 is defined by bearing of the flap, and in particular of its peripheral lip 244, on the lip 226 of the corresponding wall 224. In the position of opening (FIG. 20b), the counterweight 270 of the flap may be located (in part) in the channel or outside of the channel 286. In this latter case, it does not disturb the flow of air through the opening 220, which is entirely free. The position of opening of each flap 214 may be defined by bearing of the flap, and in particular of its wall 242, on the wall 216a. It is the air that applies sufficient force to the flaps, and in particular to the front faces of their walls 242, to cause them to pivot about the axes A.

In order to be able to be mounted on the support 212, the flaps 214 should not be equipped with their counterweights 270. A first step of mounting the flaps 214 on the support 212 consists in presenting the flaps in front of the openings 220 by engaging their arms 276 in the latter. The swivel elements 240 are then mounted in the housings 238 by elastic snap-fitting. The swivel elements 240 are forcibly engaged in the housings 238, and in particular in the cavities 250. The swivel elements 240 then bear on the teeth 258 of the tabs, preferably beveled, in order to force the tabs to deform elastically by moving radially in the cavity 252. The swivel elements 240 then slide on the teeth 258 until they penetrate the cavity 250. The tabs 254 then substantially resume their original position. The swivel elements 240 are then held in the cavities by the teeth 258, as may be seen in FIG. 19. In this position, the swivel elements 240 are able to turn in the cavities 250 while remaining held in these cavities by the teeth 258 of the tabs 254. Advantageously, the swivel elements 40 allow pivoting of the flap 214 about the axis A through an angle between approximately 30 and 80° (angular displacement). The counterweight 270 may then be fastened to the arms 276 by engagement of its fingers 274 in the housings 280 of the hooks 278.

In the variant shown in FIG. 21, and concerning, likewise, the second aspect of the invention, the flap 314 differs from the flap 214 described above essentially in that the counterweight 270 is replaced by two separate counterweights 370, which are each connected to the wall 342 of the flap by a connecting arm 376. The flaps 314 may be produced as a single component with their counterweights (which are thus not detachable), for example from PP. The counterweights 370 are advantageously configured in order to pass through the opening, and in particular the grille, of the support of the extractor when the flap 314 is mounted on the support (which may be identical to the support 212).

Figure 22:
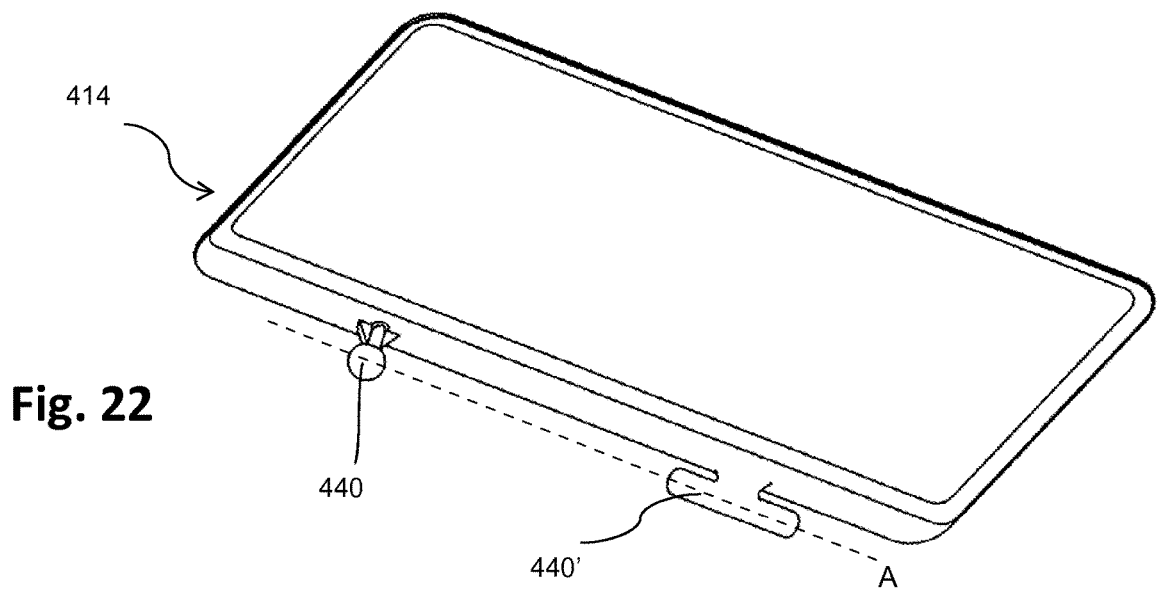
FIG. 22 is a schematic view in perspective of a further variant embodiment of a flap according to the invention.
Figure 23:
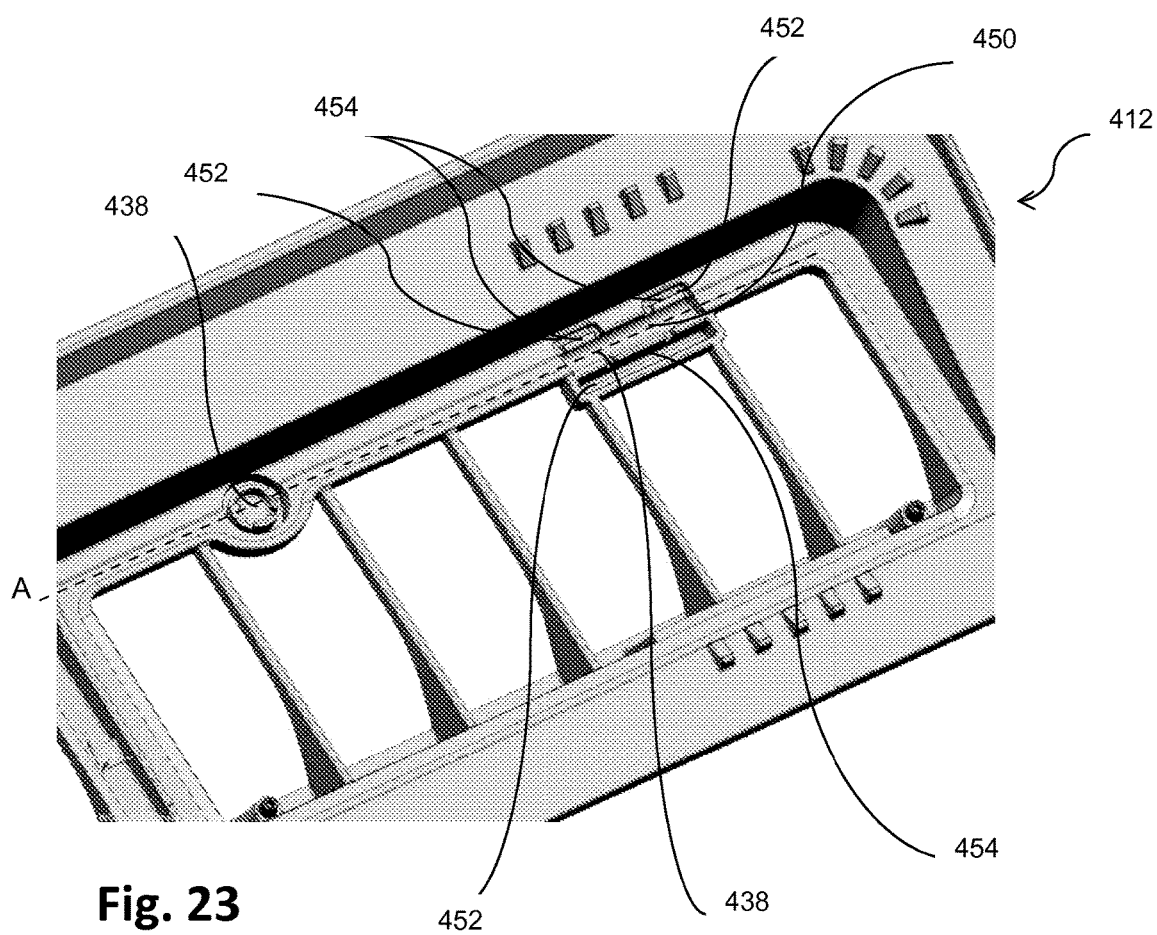
FIG. 23 is a partial schematic view in perspective of a support for the flap of FIG. 22.

FIGS. 22 and 23 show a further variant of the invention in which the articulation means of each flap 414 comprise a swivel element 440 and a mechanical rod 440' in the form of a "capsule".

The swivel element 440 is similar to the swivel element described above and illustrated in FIG. 8. The housing 438 of the swivel element 440, provided on the support 412, is similar to the housing 38 described above with reference to FIG. 9.

The housing 438 of the rod 440' has a rectangular general form and comprises a first, cylindrical, cavity 450 and second, cylindrical or parallelepipedal, cavities 452 extending, respectively, below and above the cavity 450 and spaced therefrom, relative to the longitudinal axis of the first cavity 450. The cavity 450 of each housing is closed at the front by a back wall 453 that makes it possible to seal the housing 438.

In the spaces extending between the cavities 450', 452 are rectilinear tabs 454 that are elastically deformable, in particular in terms of flexing. These tabs 454 are three in number here, being two upper tabs and one lower tab.

The tabs 454 each comprise at their rear or free ends a projecting tooth for catching the rod 440'. The tabs 454 can be deformed by flexing and are each designed to move in planes perpendicular to the axis of the cavity 450. The cavities 452 are designed to allow these deformations, the free or rear ends of the tabs 454 being designed to come into these cavities when deformations take place.

The rod 440 is mounted in the housing 438 by elastic snap-fitting, as described above for mounting of the swivel element 440 in the housing 438. In the mounting position, the swivel element 440 and the rod 440' are able to turn in the cavities 50, 450 while remaining held in these cavities by the teeth 58, 458 of the tabs 54, 454. Advantageously, they allow pivoting of the flap 414 about the axis A through an angle of between approximately 30 and 80° (angular displacement). The axis A is one and the same as the axis of the mechanical rod 440' and passes through the center of the swivel element 440.

The flap 414 may be equipped with one or more counterweights (not shown), which may be removable.

The invention claimed is:

1. A flap (214, 314) for an air extractor (210), said flap comprising a rigid or semi-rigid wall (242, 342), articulation means (240) to allow a pivoting of the flap about an axis (A) substantially parallel to the wall, and at least one counterweight (270, 370), characterized in that said at least one counterweight is at a distance from said wall and is connected removably to said wall (242), wherein said at least one counterweight (270, 370) has an elongate form, wherein an axis (B) of extension of the elongate form is substantially parallel to said wall (242, 342);

wherein the axis (A) of pivoting and the axis (B) of extension are located in a first plane (P1) that is inclined relative to a plane of the wall (242, 342) by an angle (γ) of between 20 and 80°, and wherein the counterweight does not lie in the plane of the wall;

wherein said wall includes a front face and a rear face, said rear face separated from said front face by an upper edge (242a), a lower edge (242b) and a pair of lateral edges (242c), wherein the axis (A) of pivoting is substantially parallel to said rear face of said wall;

wherein said at least one counterweight (270, 370) is connected to said wall (242, 342) by spaced apart first and second connecting arms (276, 376), each of said first and second connecting arms having an end connected to said rear face of said wall;

and wherein the articulation means (240) is (i) independent of each of the first and second connecting arms (276, 376), (ii) spaced away from each of the first and second connecting arms and (iii) located between the first and second connecting arms (276, 376).

2. The flap (214, 314) as claimed in claim 1, wherein each of said first and second connecting arms (276, 376) extends substantially parallel to said first plane (P1).

3. The flap (214) as claimed in claim 2, wherein each of said first and second connecting arms (276) comprises, at a free end, means (278) for catching said at least one counterweight (270).

4. The flap (214, 314) as claimed in claim 1, wherein said at least one counterweight (270, 370) extends in a second plane (P2) perpendicular to the plane of the wall (242, 342) and not passing through said wall.

5. The flap (214, 314) as claimed in claim 4, wherein said second plane (P2) is substantially parallel to the upper edge (242*a*) of said wall (242, 342).

6. The flap (214, 314) as claimed in claim 1, wherein said articulation means are configured such that the axis (A) of pivoting of the flap is spaced from said wall (242, 342) by a distance (L1) smaller than that (L2) between said at least one counterweight (270, 370) and said wall.

7. An air extractor (210) of a motor vehicle, comprising a support (212) located on the motor vehicle and having at least one window (218) defining an opening (220) for the passage of air and at least one flap (214, 314) as claimed in claim 1, which is movable between a position of closure of the opening and a position of opening up the opening.

8. The air extractor (210) according to claim 7, wherein each of said first and second connecting arms traverses through the opening such that the wall (242, 342) of the flap (214, 314) is located behind the opening (220, 320) and said at least one counterweight (270, 370) of the flap is located in front of the opening.

9. The air extractor (210) as claimed in claim 7, wherein said at least one counterweight (270, 370) is connected to said wall (242, 342) by the first and second connecting arms (276, 376) traversing through both the opening (220) and a grille (222) of the opening.

10. The air extractor (210) as claimed in claim 9, wherein said at least one counterweight (270, 370) is located outside a channel (286) for the passage of air in said opening (220), in at least one position of the flap (214, 314) about said axis (A) of pivoting.

11. A flap for an air extractor, said flap comprising a rigid or semi-rigid wall running in a wall plane, articulation means to allow a pivoting of the flap about an axis of pivoting that is substantially parallel to the wall, and at least one counterweight, wherein said at least one counterweight is spaced at a distance from said wall and is connected removably to said wall, wherein said at least one counterweight has an elongate form with an axis of extension that is substantially parallel to said wall plane, wherein the counterweight does not lie in said wall plane, wherein said wall includes a front face and a rear face, said rear face separated from said front face by an upper edge, a lower edge and a pair of lateral edges, wherein the upper edge, the lower edge and the pair of lateral edges collectively define a boundary of said rear face, wherein the axis of pivoting is substantially parallel to said rear face of said wall;

wherein said at least one counterweight is connected to said wall by at least one connecting arm having an end connected to said rear face of said wall at a location spaced from and inward of the boundary of said rear face;

wherein the articulation means extends from said rear face at a location that is both spaced from and inward of the boundary of said rear face and spaced from the at least one connecting arm.

12. The flap as claimed in claim 11, wherein said at least one connecting arm comprises, at a free end, means for catching said at least one counterweight.

13. An air extractor located on a motor vehicle, comprising a support located on the motor vehicle and having at least one window defining an opening for the passage of air and at least one flap as claimed in claim 11, which is movable between a position of closure of the opening and a position of opening up the opening.

14. The air extractor according to claim 13, wherein the at least one connecting arm traverses through the opening such that the wall of the flap is located behind the opening and said at least one counterweight of the flap is located in front of the opening.

15. The air extractor as claimed in claim 14, wherein the at least one connecting arm traverses through both the opening and a grille of the opening.

\* \* \* \* \*